Aug. 19, 1924.
H. M. MOFFETT
AUTOMOBILE SIGNAL
Filed April 26, 1921  3 Sheets-Sheet 1
1,505,160
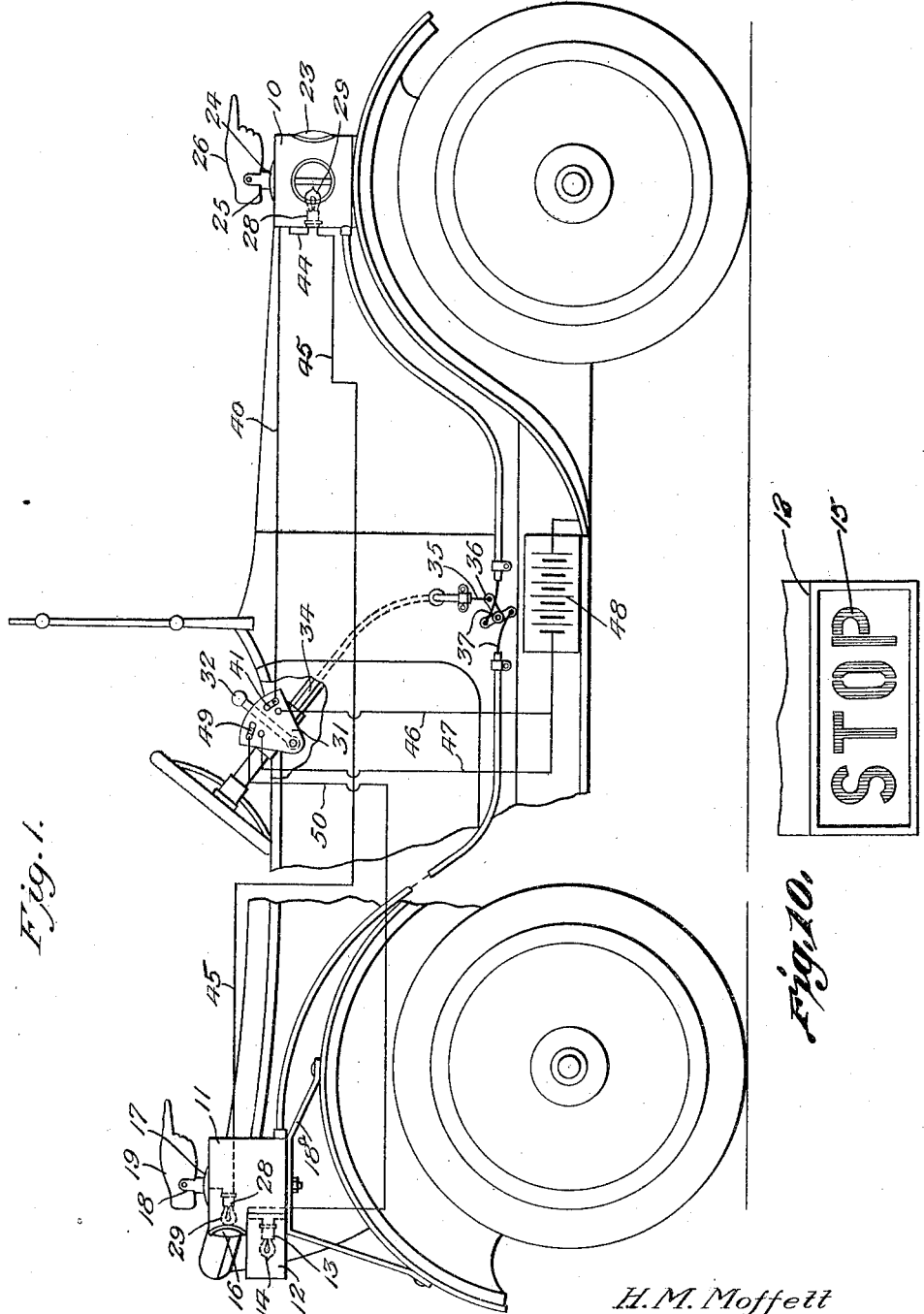
H. M. Moffett
INVENTOR
BY Victor J. Evans
ATTORNEY
WITNESS:
Edwin F. McKee

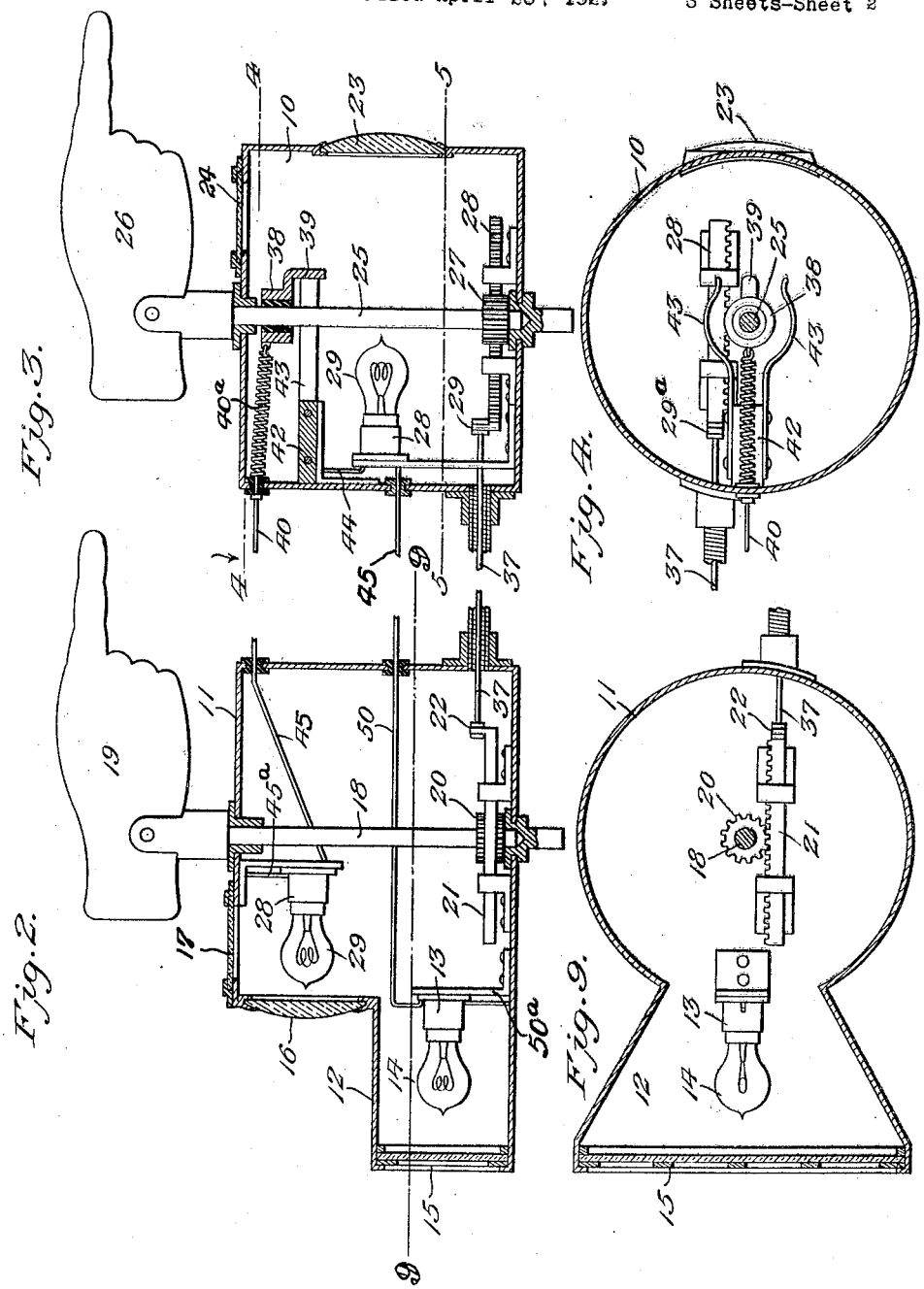

Aug. 19, 1924.
H. M. MOFFETT
1,505,160
AUTOMOBILE SIGNAL
Filed April 26, 1921    3 Sheets-Sheet 3
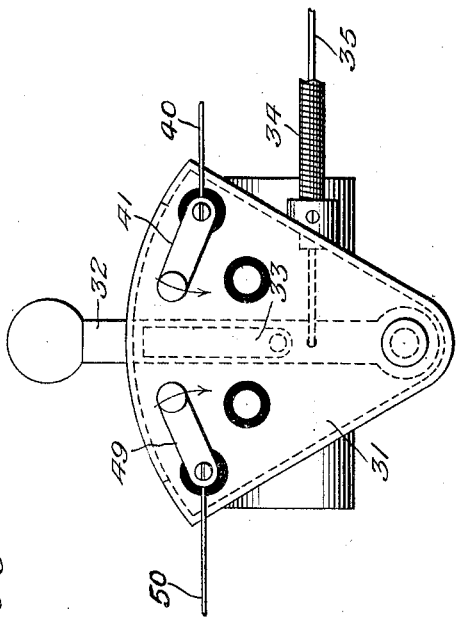
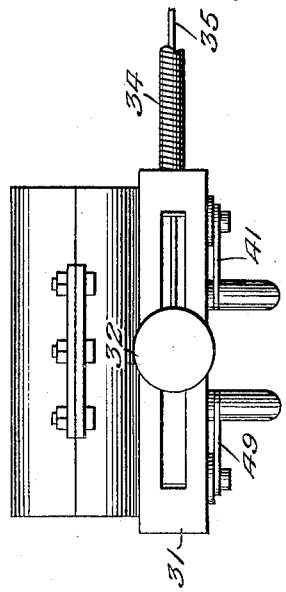
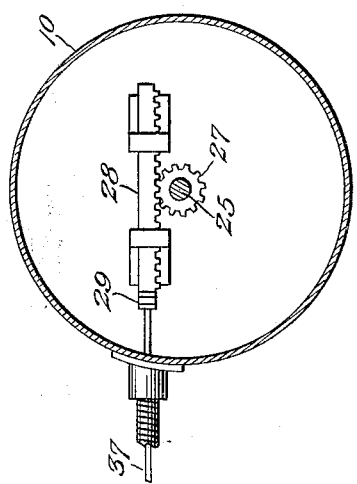
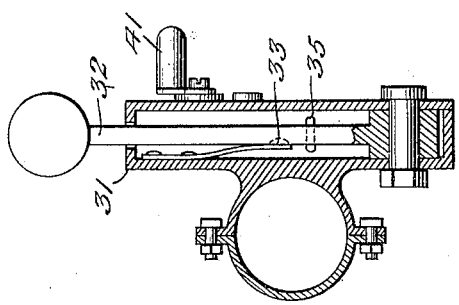
H. M. Moffett INVENTOR
BY Victor J. Evans ATTORNEY
WITNESS: Edwin G. McKee Patented Aug. 19, 1924.

1,505,160

UNITED STATES PATENT OFFICE.

HARLEY M. MOFFETT, OF DESHLER, OHIO.

AUTOMOBILE SIGNAL.

Application filed April 26, 1921. Serial No. 464,761.

*To all whom it may concern:*

Be it known that I, HARLEY M. MOFFETT, a citizen of the United States, residing at Deshler, in the county of Henry and State of Ohio, have invented new and useful Improvements in Automobile Signals, of which the following is a specification.

This invention relates to signals, particularly to direction signals for vehicles, and has for its object the provision of a novel signalling device adapted to be mounted upon the front and rear of an automobile whereby to apprise the drivers of other vehicles of any intended change in the direction and also to apprise traffic officers of a contemplated change in direction or a stop, the advantage of the device being that it tends to reduce the number of accidents and prevent congestion.

An important and more specific object is the provision of a device of this character which is manually operable to effect the signalling action and which is provided with electric illuminating means adapted to be used at night for illuminating the signal members so as to render them easily visible.

Another object is the provision of a signalling device of this character in which the rear signalling element has associated therewith an auxiliary signal which is separately operable to apprise the drivers of following vehicles of an intended stop.

An additional object is the provision of a device of this character which will be simple and inexpensive in manufacture and installation, highly efficient in use, durable in service and a general improvement in the art.

With the above and other objects and advantages in view, the invention consists in the details of construction to be hereinafter described and claimed, and illustrated in the accompanying drawings, in which:—

Figure 1 is a side elevation of an automobile showing my device applied thereto.

Figure 2 is a vertical longitudinal sectional view taken through the rear signalling member.

Figure 3 is a vertical longitudinal sectional view taken through the forward signalling member.

Figure 4 is a cross sectional view on the line 4—4 of Figure 3.

Figure 5 is a detail cross sectional view on the line 5—5 of Figure 3.

Figure 6 is a detail elevation of the control means mounted upon the steering post.

Figure 7 is a vertical section therethrough. Figure 8 is a plan view, Figure 9 is a horizontal section on the line 9—9 of Figure 2 and Figure 10 is a rear elevation of the stop signal.

Referring more particularly to the drawings, I have shown my device as comprising a casing 10 adapted to be secured upon the front part of an automobile, and a casing 11 adapted to be secured upon the back or upon the left rear fender of the automobile. The casings are similar and may be formed of any desired material such as sheet metal properly japanned or enameled. Formed upon or secured upon the lower rear portion of the rear casing 11 is an extension casing 12 within which is located a suitable socket 13 carrying an incandescent bulb 14 for a purpose to be described. The back of this extension casing 12 is covered by a sheet of material 15 having the legend "Stop" thereon in cut-out letters, the cut-out portion being covered with red glass. The upper rear portion of the rear casing 11 is provided with an opening covered by a piece of glass 16 and the top of the casing is provided with an opening covered by a piece of glass 17 for a purpose to be described. The numeral 18ª designates a suitable bracket by means of which the rear casing 11 is secured upon the rear of the automobile body or upon a rear fender as is preferred. This bracket is merely illustrative as it is quite conceivable that a different type of bracket might be used with equal advantage.

Journaled through the rear casing 11 is a vertically disposed shaft 18 which carries upon its upper end above the casing an indicator 19 formed as the representation of a human hand. The lower portion of this shaft 18 carries a pinion 20 with which meshes a slidable rack bar 21 provided at its forward end with an upturned lug 22. The front casing 10 is formed substantially centrally of the front wall with an opening covered by a glass plate or sheet 23 and is formed in its top with an opening covered by a glass sheet or plate 24 for a purpose to be described. Journaled through the front casing 10 is a vertically disposed shaft 25 which carries at its upper end above the casing an indicator member 26 formed as the representation of a human hand. Within the lower portion of the casing 10 the shaft carries a pinion 27 with which meshes a slidably mounted rack bar 28 having its rear end formed with an upwardly extending lug 29ª. Mounted within the casing 10 is a suitable socket 28 carrying an electric light bulb 29. It should be stated in passing that the rear casing 11 is likewise provided with a socket and bulb 28 and 29 respectively.

Mounted upon the automobile at some convenient position within reach of the driver, as for instance upon the side of the body or upon the steering column, is a casing 31 within which is pivoted an operating lever 32 moving through a slot in the top of the casing and normally held in neutral position by means of a suitable spring 33. Connected with this casing 31 and extending downwardly to the chassis of the vehicle is a tubular housing 34 within which is movable a flexible member 35 connected at its upper end with the lever 32 and connected at its lower end with a T-shaped lever 36 which is pivotally mounted as shown and which is connected with flexible members 37 which are connected with the lugs 22 and 29.

Mounted upon the shaft 25 is a supporting member 38 carrying a contact 39 with which is connected a spring 40ª connected with or formed in a wire 40 leading to a switch 41 on the casing 31. Secured within the upper portion of the forward casing 10 is a support 42 which carries a substantially U-shaped contact 43 straddling the shaft 25 and having its arms engageable by the contact 39. This contact 43 is connected by a wire 44 with one terminal of the electric light bulb 29 in the casing 10 which has its other terminal connected by a wire 45 with one terminal of the incandescent bulb 30 in the rear casing 11. The other terminal of the second mentioned bulb is grounded by a wire 45ª. Connected with the switch structure are wires 46 and 47 connected with the battery 48 which has one terminal grounded on the vehicle frame.

Also mounted on the casing 31 is a switch 49 from which leads a wire 50 leading to the bulb 14 in the stop signal. This bulb has its other terminal grounded by a wire 50ª.

In the operation of the device, it will be seen that under ordinary conditions, the signal members 19 and 26 point straight ahead and all the incandescent bulbs are deenergized. Assuming that the operator intends to make a turn to either the right or the left, he grasps the lever 32 and moves it either forwardly or rearwardly, as the case may be, whereupon the movement of the flexible member 35 will cause swinging movement of the T-shaped lever 36 and this will result in a corresponding pull upon the flexible members 37 and this will of course result in longitudinal movement of the rack bars 20 and 28. As these rack bars engage with the pinions 21 and 27 respectively, it is quite apparent that the shafts 18 and 25 carrying the signal members 19 and 26 will be rotated so that the signal members will be swung to indicate the direction which the driver intends to turn. Owing to the provision of the spring 40ª, when the operator releases his grasp upon all the parts, the lever 32 will be returned to its normal or inoperative position.

When it is desired to use the device at night, the operation is the same except that the switch 41 must be closed. When this is done, it will be seen that when the signal members 19 and 26 are turned as above described, the contact 39 will engage against one of the arms of the contact member 43, and this will result in closing the circuit through the contacts 39 and 43 so that current will flow through both the incandescent bulbs 29. The light thrown off by these lamps will pass through the glass plates or sheets 17 and 24 and will effectively illuminate the signal members 19 and 26 so that they will be readily visible. When the operator releases his grip upon the lever 32 and the signal members 19 and 26 return to normal position, it will be apparent that the contact member 39 will be disengaged from the contact 43 so that the lamps will be automatically deenergized.

In case the operator intends to stop it is merely necessary that he close the switch 49 whereupon the incandescent bulb 14 in the stop signal casing 12 will be energized and this will cause the light to be projected through the cut-out figures of the legend "Stop". This stop signal is entirely independent of the remainder of the device and is intended to be used by day as well as by night so as to attract attention.

From the foregoing description and a study of the drawings it will be apparent that I have thus provided a very simply constructed and consequently inexpensive signalling device which may be readily installed without necessitating alterations in the construction of the automobile itself, which is very quickly and easily operated, which is not likely to get out of order, and which will efficiently perform the functions to which it is intended.

While I have shown and described the preferred embodiment of the invention, it is of course to be readily understood that I reserve the right to make such changes in the form, construction and arrangement of parts as will not depart from the spirit of the invention or the scope of the subjoined claim.

Having described the invention what I claim is:

An actuating means for a vehicle signal, the same comprising a casing, means for mounting said casing on an automobile within convenient reach of the operator thereof, a lever pivoted within the casing, a tubular housing connected with the casing and extending downwardly therefrom, a flexible operating element movable within the said housing and connected at one end to said lever intermediate the ends of the latter, said flexible operating element connected at its other end to an arm of a pivoted T-shaped member, a flexible element connected to each of the other arms of the T-shaped member and extending in opposite directions therefrom, a rack bar secured to the outer end of each of the flexible elements last named, guides for said rack bars, vertically extending shafts, pinions on said shafts and in mesh with the teeth of said racks, and a spring within said casing and adapted to retain said lever in neutral position when the lever is returned to such position.

In testimony whereof I affix my signature.

HARLEY M. MOFFETT.